(12) United States Patent
Seo

(10) Patent No.: US 6,426,808 B1
(45) Date of Patent: Jul. 30, 2002

(54) FEEDING DEVICE

(75) Inventor: Shuzo Seo, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/186,157

(22) Filed: Nov. 5, 1998

(30) Foreign Application Priority Data

Nov. 6, 1997 (JP) ................................................ 9-320348

(51) Int. Cl.[7] ................................................ H04N 1/04
(52) U.S. Cl. ........................................ 358/498; 358/496
(58) Field of Search ............................... 358/498, 496, 358/474, 400; 271/160

(56) References Cited

U.S. PATENT DOCUMENTS 5,001,520 A * 3/1991 Kawano ..................... 355/308
5,926,289 A * 7/1999 Brandestini et al. ........ 358/487

* cited by examiner

Primary Examiner—Jerome Grant, II
Assistant Examiner—Negussie Worku
(74) Attorney, Agent, or Firm—Greenblum & Bernstein, P.L.C.

(57) ABSTRACT

A feeding device comprises a pair of guide shafts, and a film holder which is movably supported by the guide shafts. A slide-mount, which holds a film, is attached to the film holder. Guide members are formed on side surfaces of the film holder, and are slidably engaged with the guide shafts. Each of the guide members has a first bearing member and a second bearing member. The first bearing member and the second bearing member are offset in a direction in which the guide members extend. The first bearing member is engaged with an upper surface of the guide shafts, and the second bearing member is engaged with a lower surface of the guide shafts.

18 Claims, 5 Drawing Sheets

FEEDING DEVICE

BACKGROUND OF THE INVENTION

1. Field of the Invention

The present invention relates to a feeding device provided in a film scanner to optically read an image recorded in a film.

2. Description of the Related Art

Conventionally, there is known a film scanner, by which, while a film is fed frame by frame in a predetermined direction, an image recorded in the film is illuminated by a light beam and formed on and read by an imaging device. For feeding the film, the film scanner is provided with a feeding device, which has a plate-shaped holder by which the film is held and positioned at a predetermined reading position. The holder has a plurality of bearing members, which are slidably engaged with a guide shaft, so that the holder is movable along the guide shaft. The bearing members are projected from a body of the holder, and the body and the bearing member are formed as one body. Further, a hole is formed in each of the bearing members to enable engagement with the guide shaft.

The holder is usually made of synthetic resin by using a metal mold. One to the provision of a slide core in the mold to make the hole in the bearing members, a manufacturing cost increases. Further, during the manufacturing process, when the slide core is removed from the holder so that the mold is disassembled, the slide core and the hole abrade each other, which causes deterioration in an accuracy of the hole. As a result, the holder may not smoothly move relative to the guide shaft, or the film may not be set at a proper or focusing position of a reading optical system by which the image is read. Namely, in this case, since the exact positioning of the film cannot be attained, accurate image information cannot be obtained when the image is optically read, thereby producing a deterioration in the image quality.

SUMMARY OF THE INVENTION

Therefore, an object of the present invention is to provide a feeding device in which a holder is easily manufactured, and by which an accurate positioning of the film can be attained.

According to the present invention, there is provided a feeding device comprising a pair of guide shafts, a holder and first and second bearing members. The pair of guide shafts extend parallel to each other. The holder holds a film to be read by a reading device. The first and second bearing members, attached to the holder, are slidably engaged with the guide shafts so that the holder is movable along the guide shafts. The first bearing member includes a first bearing surface engaged with each of the guide shafts. The second bearing member includes a second bearing surface engaged with each of the guide shafts. The first and second bearing surfaces face different directions and are offset from each other along the guide shafts.

Further, according to the present invention, there is provided a feeding device comprising a pair of guide shafts and a moving member. The pair of guide shafts extend parallel to each other. The moving member has first and second bearing members, which are slidably engaged with the guide shafts so that the moving member is movable along the guide shafts. The first bearing member includes a first bearing surface engaged with each of the guide shafts. The second bearing member includes a second bearing surface engaged with each of the guide shafts. The first and second bearing surfaces face different directions and are offset from each other along the guide shafts.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
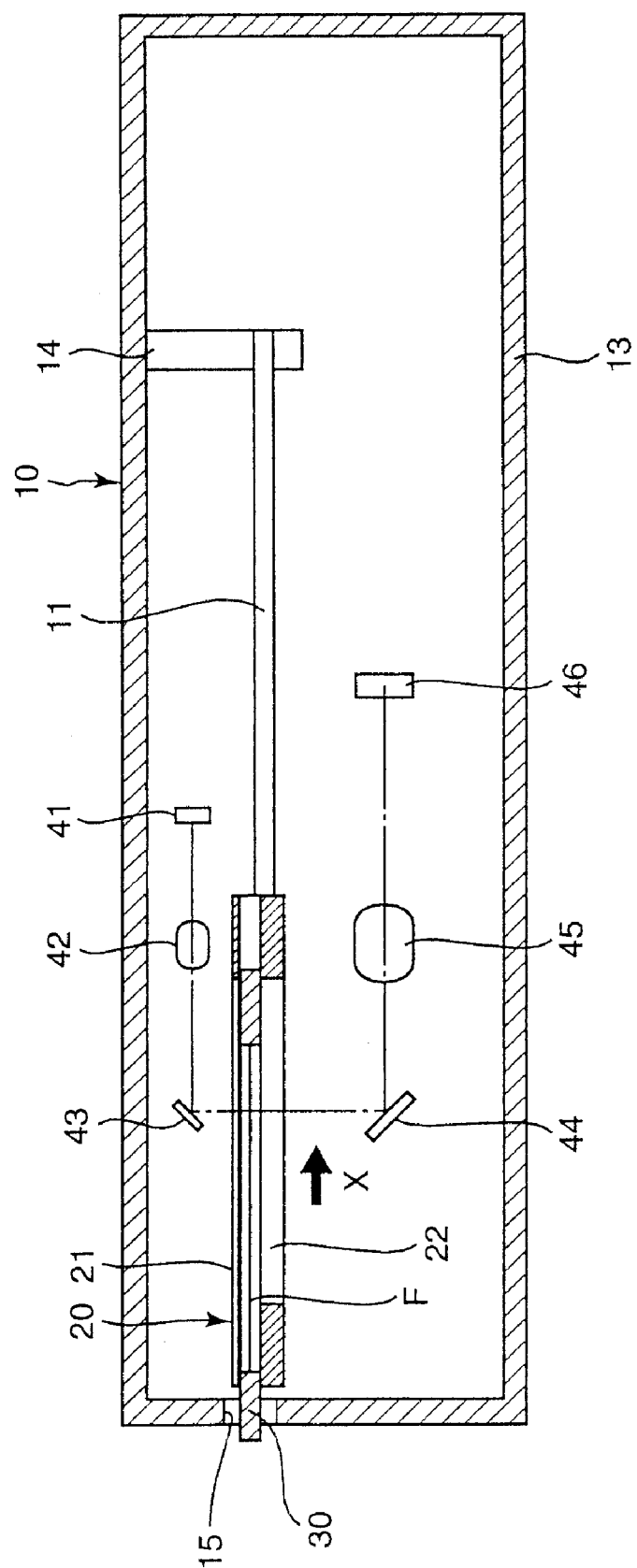
FIG. 1 is a sectional view showing a film scanner provided with a feeding device of a first embodiment of the present invention.

The present invention will be described below with reference to embodiments shown in the drawings.

Figure 2:
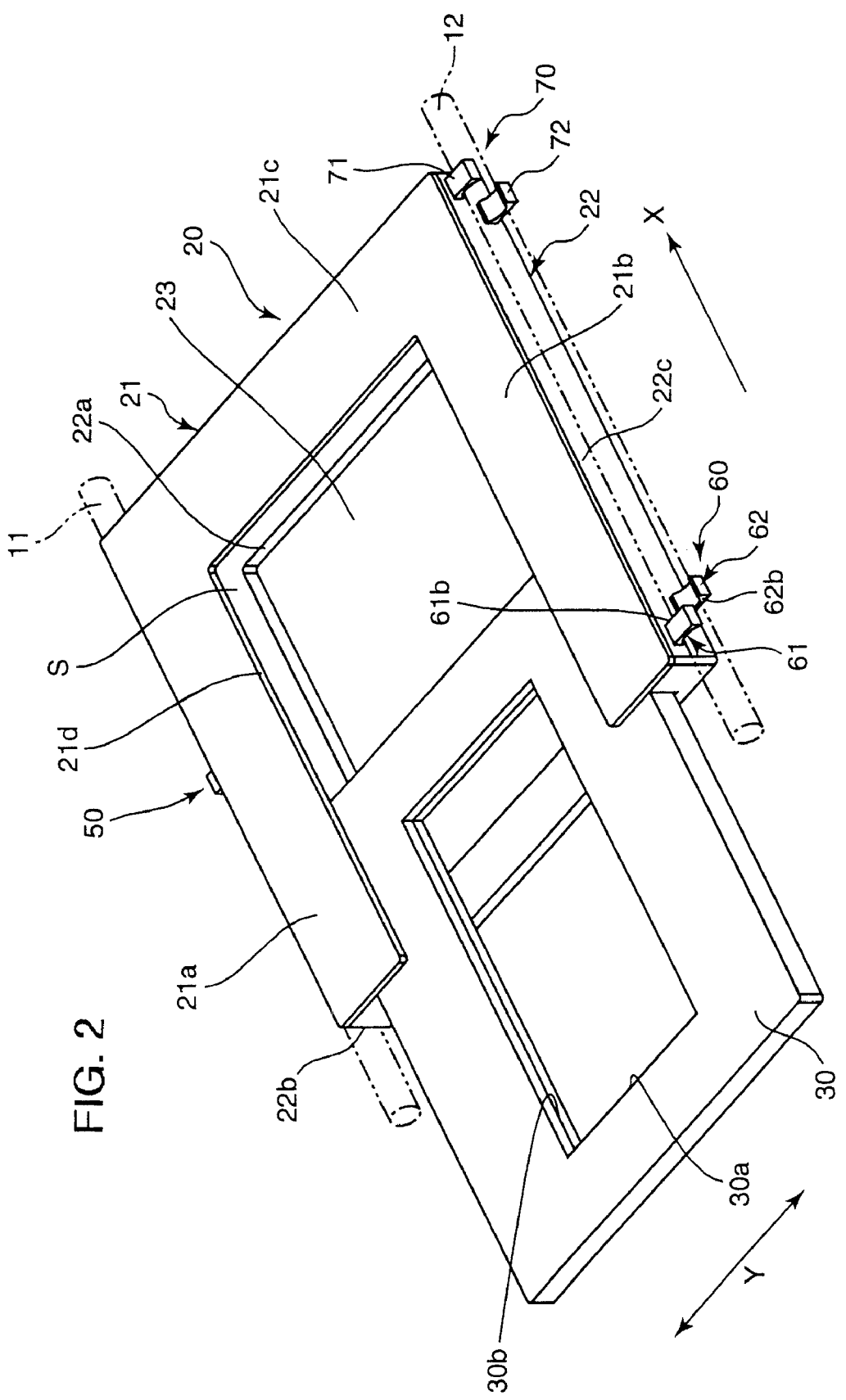
FIG. 2 is a perspective view showing a film holder and a slide-mount.

FIG. 1 is a sectional view showing a film scanner 10 provided with a feeding device of a first embodiment of the present invention. FIG. 2 is a perspective view showing a film holder 20 and a slide-mount 30. The slide-mount 30 is provided for supporting a film F, and the film holder 20 can be attached to the film scanner 10. Note that, in FIG. 2, the film F is not shown.

A pair of guide shafts 11 and 12 are provided in a housing 13. The guide shafts 11 and 12 are supported by a guide support member 14 fixed on a ceiling of the housing 13, and linearly extend parallel to each other in the longitudinal direction of the housing 13. The film holder 20 is slidably supported by the guide shafts 11 and 12, so that the film holder 20 can be moved in a direction indicated by an arrow X using a drive source (not shown). The slide-mount 30 is fitted in the film holder 20.

An illumination light source 41, a first lens 42 and a first mirror 43 are disposed above and between the guide shafts 11 and 12, and a second mirror 44, a second lens 45 and an imaging device (CCD) 46 are arranged beneath and between the guide shafts 11 and 12. An illumination light beam emitted by the illumination light source 41 is led to the first mirror 43 through the first lens 42. The light beam is reflected by the mirror 43 and is led to the film F, so that a line-shaped light beam illuminates the film F. The light beam, passing through the film F, is reflected by the second mirror 44, and is led to the imaging device 46 through the second lens 45.

Thus, a line of an image recorded on the film F is sensed by the imaging device 46, so that the optical line image is converted into an electrical signal by the imaging device 46. The electrical image signal is inputted to an image process circuit (not shown), and is subjected to predetermined image processing. After the line is sensed by the imaging device 46, the film holder 20 is moved by a predetermined amount in the direction X, and thus the next line of the image is sensed.

By repeating this operation, the whole of the image recorded in the film F is read.

The film holder 20 has an upper member 21 and a base member 22. The base member 22 is a rectangular frame having a rectangular inner periphery 22a defining an opening 23. The upper member 21 has a pair of cover portions 21a and 21b, end portions of which are connected by a connecting portion 21c. Surfaces of an inner periphery 21d of the upper member 21 are coplanar with the surfaces of the inner periphery 22a of the base member 22. A space S is formed between the upper member 21 and the base member 22 so that the slide-mount 30 can be inserted therebetween. An area of an inner periphery 30a of the slide-amount 30 is slightly smaller than areas of the inner peripheries 21d and 22a. A continuous thin groove 30b is formed in surfaces of the inner periphery 30a, so that the film F, when held by the slide-mount 30, maintains a flat plane.

A guide shafts 11 and 12 are horizontal rods having circular sections of equal diameter. An inlet mouth 15 is formed in the housing 13 at a height at which the guide shafts 11 and 12 are provided. The slide-mount 30 can be inserted into and removed from the housing 13 through the inlet mouth 15. The slide-mount 30 is attached to the film holder 20 which is engaged with the guide shafts 11 and 12.

Figure 3:
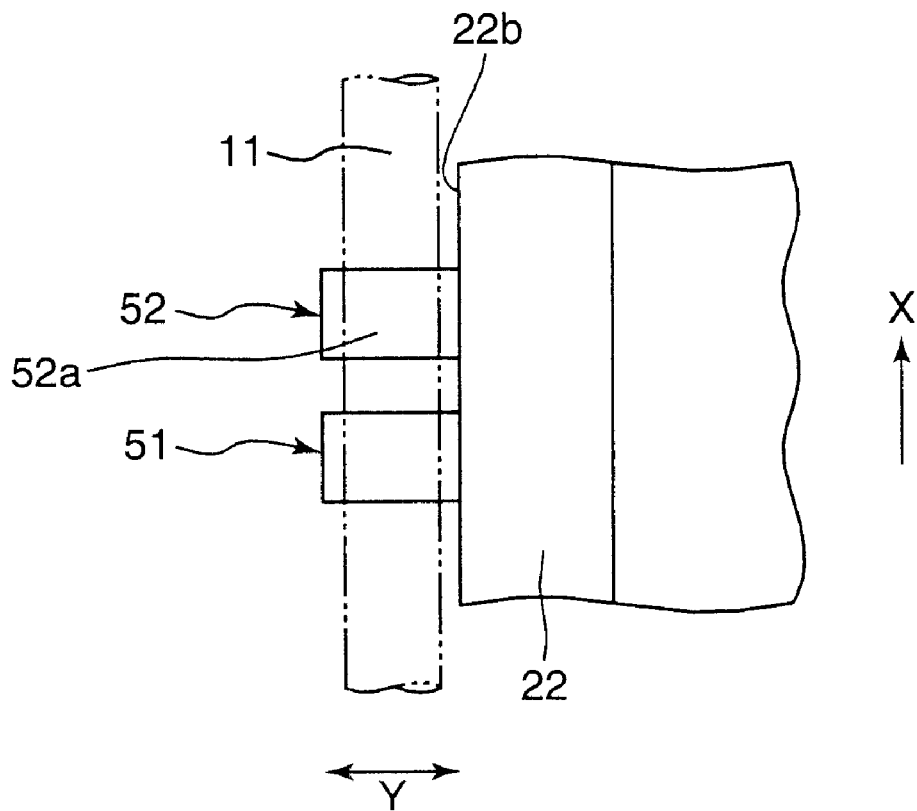
FIG. 3 is a plan view showing a guide bearing.
Figure 4:
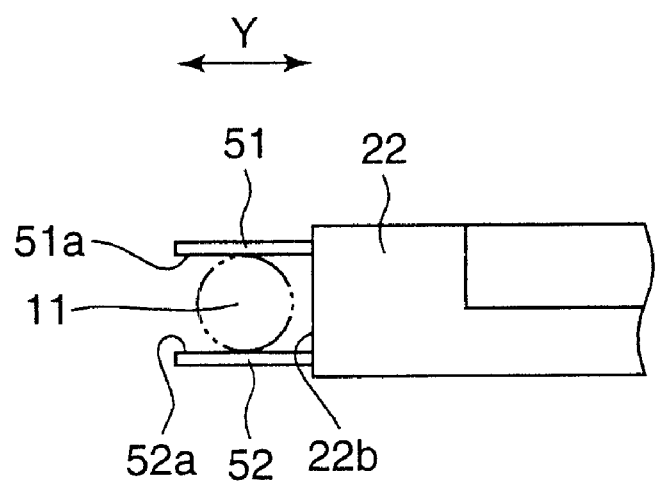
FIG. 4 is a front view showing the guide bearing shown in FIG. 3.
Figure 5:
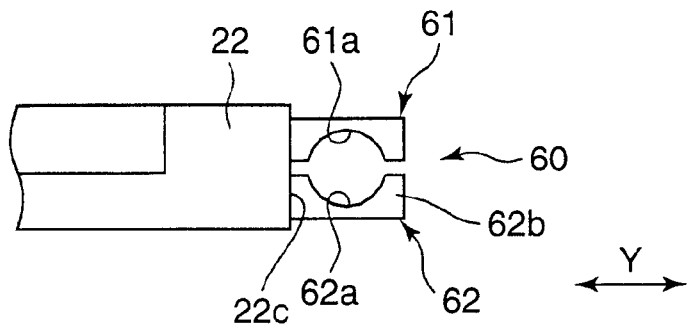
FIG. 5 is a front view showing a guide bearing which is not shown in FIG. 3.

FIGS. 3, 4 and 5 show a construction with which the film holder 20 is engaged with the guide shafts 11 and 12. The film holder 20 has three guide bearings 50, 60 and 70, which are integrally formed with the base member 22 and project from side surfaces 22b and 22c of the base member 22. The guide bearing 50 is positioned at a center of the side surface 22b in the direction X. The guide bearings 60 and 70 are provided on the side surface 22c, which is opposite to the side surface 22b, and are positioned at end portions of the side surface 22c.

The guide bearing 50 has a first bearing member 51 and a second bearing member 52, which are flat plates. The first bearing member 51 has a flat bearing surface 51a facing downward, and the second bearing member 52 has a flat bearing surface 52a facing upward. The lower flat surface 51a and the upper flat surface 52a are parallel to each other. The lower flat surface 51a and the upper flat surface 52a are separated from each other by a distance equal to the diameter of the guide shaft 11, when viewing in the direction X, so that the lower flat surface 51a and the upper flat surface 52a are slidably engaged with the guide shaft 11.

Conversely, when viewing from the upper side of the film holder 20, the first and second bearing members 51 and 52 are offset from each other along the guide shaft 11 as shown in FIG. 3. Thus, since the guide bearing 50 is not subjected to any lateral forces, which act in a direction shown by an arrow Y, the guide bearing 50 can be displaced in the direction Y relative to the guide shaft 11.

On the other hand, the guide bearing 60 has a first bearing member 61 and a second bearing member 62. The first bearing member 61 has a flat upper surface and a concave lower surface 61a. The second bearing member 62 has a flat lower surface and a concave upper surface 62a. The concave lower surface 61a and the concave upper surface 62a are cylindrical surfaces having approximately the same curvature as that of the guide member 12. The concave lower surface 61a is slidably engaged with an upper surface of the guide member 12, and the concave upper surface 62a is slidably engaged with a lower surface of the guide member 12, so that the first and second bearing members 61 and 62 can be moved along the guide member 12.

When viewing from the upper side of the film holder 20, as can be understood from FIG. 2, the first and second bearing members 61 and 62 are offset from each other along the guide shaft 12. The second bearing member 62 is placed closer to the center of the side surface 22c with respect to the first bearing member 61. The first bearing member 61 has an end surface 61b facing in the direction X, and the second bearing member 62 has an end surface 62b facing opposite to the direction X. The first and second bearing members 61 and 62 do not overlap each other, so that the end surfaces 61b and 62b are separated from each other when viewing from an upper side.

The guide bearing 70 has basically the same structure as the guide bearing 60. Namely, the guide bearing 70 has a first bearing member 71 and a second bearing member 72, which have concave surfaces, slidably engaged with the guide member 12.

Thus, the film holder 20 can be moved along the pair of guide shafts 11 and 12. The bearing members 61, 62, 71 and 72 substantially encircle the guide shaft 12, while the bearing members 51 and 52 tangentially contact the guide shaft 11 to engage only at top and bottom surfaces of the guide shaft 11. Therefore, the film holder 20 can be moved in the longitudinal direction X and marginally displaced in the breadth direction Y.

As described above, in the first embodiment, the film holder 20 is provided with the bearing members 61, 62, 71 and 72, so that the film holder 20 can be moved along the guide member 12. Therefore, the film F can be fixed at a predetermined position with high accuracy, and thus, an image recorded in the film F can be detected by the imaging device 46 with high accuracy.

Further, since the bearing members 61, 62, 71 and 72 are positioned in such a manner that the respective bearing members 61, 62, 71 and 72 do not overlap when viewing in the plan direction of the film holder 20, the base member 22 of the film holder 20 can be manufactured using two molds, which are separated from each other in opposite directions when removing the film holder 20, and thus a highly accurate manufacturing of the film holder 20 can be performed easily, and the manufacturing cost can be reduced in comparison with a conventional device.

Furthermore, the bearing members 51 and 52 are flat plates, so that the film holder 20 can be displaced in the breadth direction, and therefore, a manufacturing accuracy of the guide member 11 in the direction Y can be lowered, further reducing a manufacturing cost.

Figure 6:
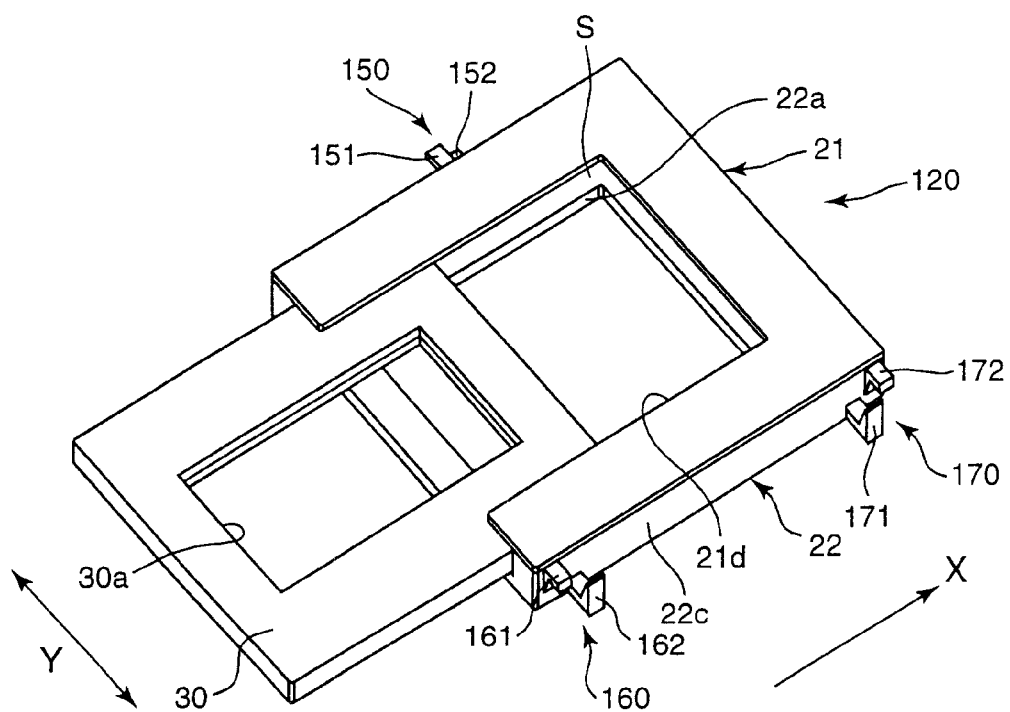
FIG. 6 is a perspective view showing a film holder, which is used in a second embodiment, and the slide-mount.
Figure 7:
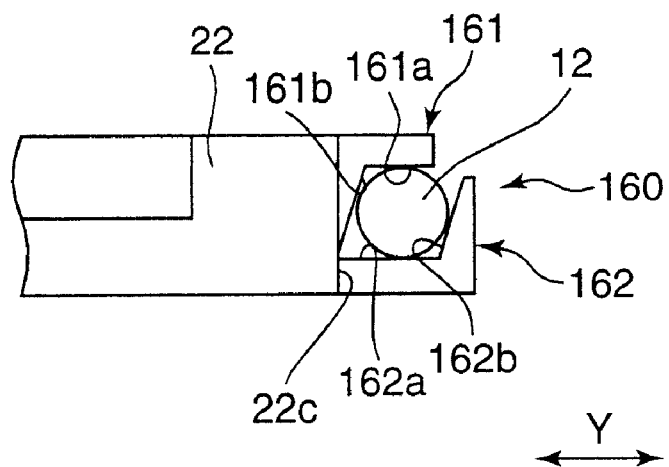
FIG. 7 is a front view showing a guide bearing provided in the second embodiment.

FIG. 6 shows a film holder 120, which is used in a second embodiment, and the slide-mount 30. In the second embodiment, the film holder 120 has guide bearings 150, 160 and 170. The construction of the guide bearing 150 is the same as that of the guide bearing 50 of the first embodiment, and the constructions of the guide bearings 160 and 170 are different from those of the guide bearings 60 and 70 of the first embodiment. FIG. 7 shows the guide bearing 160, which has basically the same construction as the guide bearing 170. The other constructions in the second embodiment are the same as those of the first embodiment. Therefore, only the construction of the guide bearing 160 is described below. Note that like components are indicated by the same reference numerals as those of the first embodiment in the drawings.

The guide member 160 has first and second bearing members 161 and 162. As shown in FIG. 7, the first and second bearing members 161 and 162 are L-shaped. The first bearing member 161 has first and second engaging surfaces 161a and 161b, which are engaged with the guide shaft 12. The first engaging surface 161a is in parallel with the film F (see FIG. 1). The second engaging surface 161b forms an angle of approximately 100 degrees with respect to the first engaging surface 161a. Similarly, the second bearing member 162 has third and fourth engaging surfaces 162a and 162b, and the third and fourth engaging surfaces 162a and 162b form an angle of approximately 100 degrees. The distance between the first engaging surface 161c and the third engaging surface 162a and the distance between the second engaging surface 161b and the fourth engaging surface 162b are approximately the same as the diameter of the guide shaft 12.

Therefore, according to the second embodiment, similar to the first embodiment, the film holder 120 can be slidably supported by the guide shaft 11 through the guide bearings 150, 160 and 170, and the positioning of the film F can be performed with high accuracy.

Note that, although the angle between the first and second engaging surfaces 161a and 161b and the angle between the third and fourth engaging surfaces 162a and 162b in the second embodiment are approximately 100 degrees, these angles can have various values of 90 degrees and above.

Figure 8:
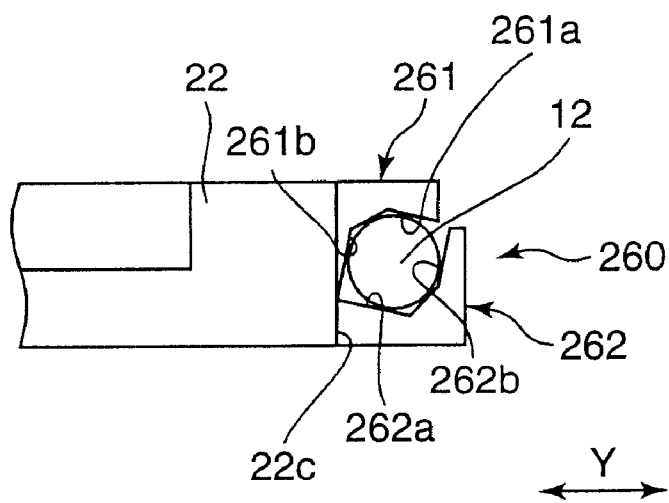
FIG. 8 is a front view showing a guide bearing provided in a third embodiment.

FIG. 8 shows a guide bearing 260 provided in a third embodiment. The other constructions in the third embodiment are the same as those of the first embodiment.

The guide member 260 has first and second bearing members 261 and 262, which are generally L-shaped. The first bearing member 261 has first and second engaging surfaces 261a and 261b, which are engaged with the guide shaft 12. The first engaging surface 261a is slightly inclined with respect to the film F (see FIG. 1). The second engaging surface 261b is perpendicular to the first engaging surface 261a. Similarly, the second bearing member 262 has third and fourth engaging surfaces 262a and 262b, and the third and fourth engaging surfaces 262a and 262b are perpendicular to each other. The distance between the first engaging surface 261a and the third engaging surface 262a and the distance between the second engaging surface 261b and the fourth engaging surface 262b are approximately the same as the diameter of the guide shaft 12.

Therefore, according to the third embodiment, the same effect as that achieved by the first and second embodiments can be obtained.

Note that, in the present invention, the number of the guide members formed on the film holders 20 and 120 is not restricted to three as in the embodiments described above.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 9-320348 (filed on Nov. 6, 1997) which is expressly incorporated herein, by reference, in its entirety.

What is claimed is:

1. A feeding device comprising:
   a pair of guide shafts that extend parallel to each other;
   a holder that holds a film to be read by a reading device; and
   at least one pair of bearing members, said pair of bearing members comprising first and second bearing members, attached to said holder, that are slidably engaged with one of said pair of guide shafts so that said holder is movable along said one of said pair of guide shafts, said first bearing member including a first bearing surface engaged with a first surface of said one of said pair of guide shafts, said second bearing member including a second bearing surface engaged with a second surface of said one of said pair of guide shafts, said first and second bearing surfaces facing different directions and being offset from each other along said one of said pair of guide shafts.

2. A feeding device according to claim 1, wherein said holder has a side surface, said first and second bearing members being projected from said side surface.

3. A feeding device according to claim 1, wherein each of said guide shafts linearly extends and has a circular cross-section.

4. A feeding device according to claim 3, wherein said first and second bearing surfaces with respect to one of said guide shafts have approximately the same curvature as that of said guide shafts.

5. A feeding device according to claim 1, wherein each of said first and second bearing surfaces with respect to one of said guide shafts has first and second engaging portions, forming an angle more than or equal to 90 degrees.

6. A feeding device according to claim 5, wherein said first engaging portion is parallel to a plane along which said holder is moved.

7. A feeding device according to claim 5, wherein said second engaging portion is inclined to a plane along which said holder is moved.

8. A feeding device according to claim 1, wherein said first bearing surface has a first flat surface engaged with one of said guide shafts and said second bearing surface has a second flat surface engaged with one of said guide shafts, said first flat surface and said second flat surface being separated from each other by a distance equal to a diameter of said guide shafts.

9. The feeding device according to claim 1, said first and second surfaces of said one of said pair of guide shafts being circumferentially spaced from each other.

10. The feeding device according to claim 1, said at least one pair of bearing members comprising a plurality of pairs of bearing members slidably engaged with said one of said pair of guide shafts.

11. The feeding device according to claim 1, said first and second bearing members of said at least one pair of bearing members comprising a single guide bearing.

12. A feeding device comprising:
    a pair of guide shafts that extend parallel to each other; and
    a moving member that includes at least one pair of bearing members, said pair of bearing members comprising first and second bearing members slidably engaged with one of said pair of guide shafts so that said moving member is movable along said one of said pair of guide shafts, said first bearing member including a first bearing surface engaged with a first surface of said one of said pair of guide shafts, said second bearing member including a second bearing surface engaged with a second surface of said one of said pair of guide shafts, said first and second bearing surfaces facing different directions and being offset from each other along said one of said pair of guide shafts.

13. The feeding device according to claim 12, said at least one pair of being members comprising a plurality of pairs of bearing members slidably engaged with said one of said pair of guide shafts.

14. The feeding device according to claim 12, said first and second surfaces of said one of said guide shafts being circumferentially spaced from each other.

15. The feeding device according to claim 12, said first and second bearing members of said at least one pair of bearing members comprising a single guide bearing.

16. A feeding device comprising:
a pair of guide shafts that extend parallel to each other;
a holder that holds a film to be read by a reading device; and
first and second guide bearing members, attached to said holder, that are slidably engaged with one of said pair of guide shafts so that said holder is movable along said one of said pair of guide shafts, said first guide bearing member including a first guiding surface engaged with a first surface of said one of said pair of guide shafts, said second guide bearing member including a second guiding surface engaged with a second surface of said one of said pair of guide shafts, said first and second guiding surfaces facing different directions and being offset from each other along said one of said pair of guide shafts.

17. The feeding device according to claim 16, said first and second surfaces of said one of said pair of guide shafts being circumferentially spaced from each other.

18. The feeding device according to claim 16, said first and second guide bearing members comprising a pair of guide bearing members, a plurality of pair of guide bearing members being provided to slidably engage said one of said pair of guide shafts.

* * * * *